Patented Dec. 1, 1936

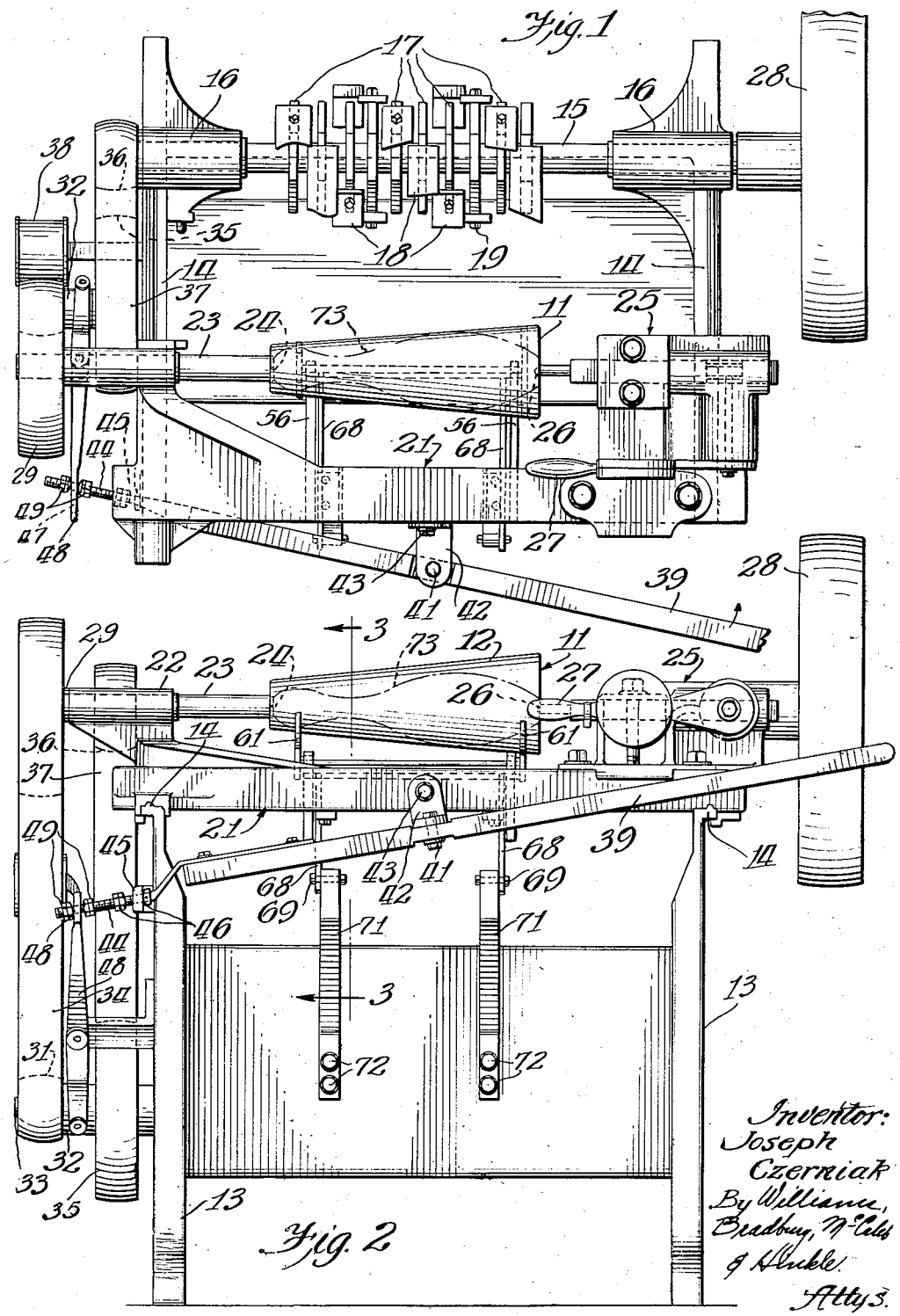

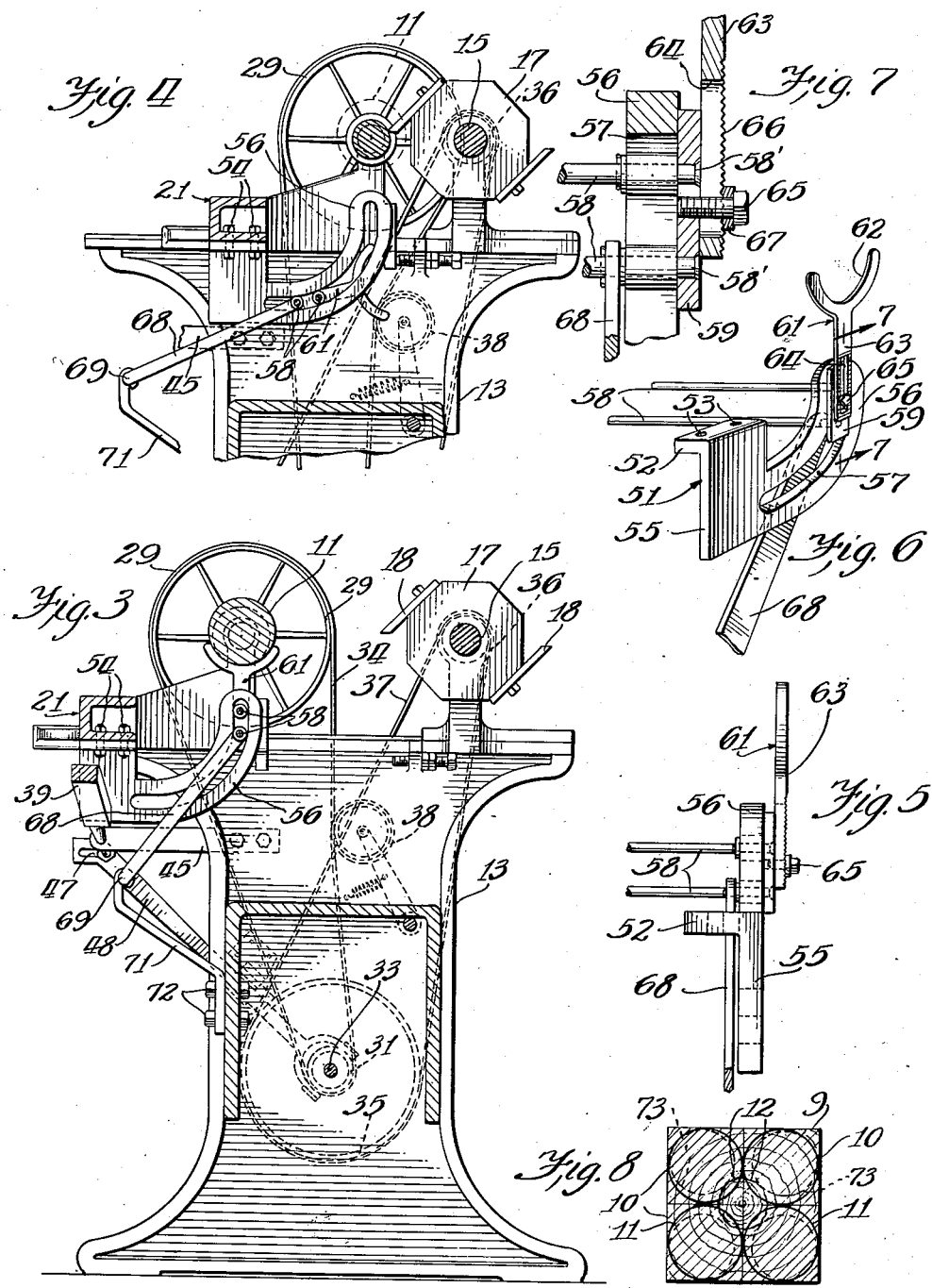

2,062,741

UNITED STATES PATENT OFFICE 2,062,741

LATHE

Joseph Czerniak, Muskegon Heights, Mich.

Application November 20, 1933, Serial No. 698,785

5 Claims. (Cl. 142—40)

This invention relates to lathes, and while a general object of the invention is to facilitate and to expedite chucking the work for rotation about a desired axis of the work during the operation of the lathe, the invention has more particular reference to a work positioning device for lathes of the type employed where it may be necessary or desirable that the chucking be effected eccentrically of the work in order that more material may be removed from one side than from the other side of the work.

An object of the invention is the provision of a novel work positioning device for lathes.

Another object of the invention is the provision of such a work positioning device for so chucking or positioning quarter-sawed stock or work as to permit the removal of the soft heart portion from the stock while removing only a minimum of the desirable hard portion in turning the stock to a desired shape.

A further object of the invention is the provision of an adjustable work positioning device for receiving and carrying the work or stock in the proper position to provide a desired axis of rotation for the work when it is clamped between the head and tail stocks of a lathe.

The invention has for another object the provision in a lathe of the movable carriage type of a work positioning device adapted to receive and to carry the work for clamping at a predetermined axis of rotation for the work without interfering with the operation of the lathe after the work has been chucked.

Other objects and advantages of my invention will appear more fully from the following description and from the accompanying drawings, in which similar characters of reference indicate similar parts throughout the several views.

Fig. 1 is a plan view of a lathe equipped with a novel work positioning device embodying the features of the invention.

Fig. 2 is a front elevation of the lathe shown in Fig. 1.

Fig. 3 is a transverse section taken substantially along the line 3—3 of Fig. 2, showing the arrangement of the novel work positioning device during the operation of chucking the work.

Fig. 4 is a fragmentary sectional view similar to Fig. 3, showing the arrangement of the work positioning device during the turning operation of the lathe.

Fig. 5 is a fragmentary front elevation of the novel work positioning device of the invention.

Fig. 6 is a perspective view of the fragmentary work positioning device shown in Fig. 5.

Fig. 7 is a cross section taken substantially along the line 7—7 of Fig. 6; and

Fig. 8 is a diagrammatic development illustrative of the manufacture of articles from quarter-sawed stock.

The invention is illustrated in connection with but is not limited to the production of bowling pins. As will be understood by those skilled in this art, bowling pins are usually made as illustrated in Fig. 8, by quarter sawing a log or block 9 and rough cutting each quarter block 10 of substantially the proper length into a blank 11 from which a bowling pin may be made. By virtue of the quarter sawing of the logs or blocks the blank may and almost invariably does have at the side 15 thereof which was originally at the center of the log or block, a soft or heart portion 12 that is unsuitable as a surface for a bowling pin because this soft heart portion 12 cannot withstand the rough usage to which such pins are subjected in use.

For the purpose of making bowling pins from the blank 11, a suitable lathe is employed. As illustrated, such a lathe has a supporting base or frame 13 providing at opposite sides thereof substantially parallel slides 14 constituting the bed of the lathe. A rotatable lathe tool shaft 15 is journaled in bearings 16 on the frame 13 for carrying and for driving a lathe tool. The lathe tool on such lathes usually includes a plurality of spaced discs or plates 17 fixed on the shaft 15 between the bearings 16, and adapted to rotate with the shaft for operating a plurality of lathe cutters or blades 18 fixed as at 19 on the discs 17.

The illustrated lathe preferably is of the movable carriage type in which a movable carriage 21 slidably rests on the slides 14 and includes a head stock 22 provided with a rotatable work shaft 23 having a live center or chuck 24 and a tail stock 25 associated with the head stock, and provided with an adjustable dead center 26 spaced from and axially aligned with the live center 24. The blank 11 may be clamped for rotation between the live center 24 and the dead center 26 by means of a tail spindle adjustment and lock 27 for adjusting the dead center 26 axially thereof.

While the lathe is being employed for turning bowling pins the cutters or blades 18 are so arranged on and spaced along the shaft 15 that the overall contour of their cutting edges in the plane, including the line along which the tools are operating on the work, is complementary with the contour of the finished bowling pin.

The shaft 23 and hence the work is adapted to be rotated once while the shaft 15 and hence the lathe tool is rotating several times. This may be accomplished by any suitable driving means for the shafts 15 and 23. In the lathe shown in Figs. 1 to 4 inclusive, a main driving means is diagrammatically illustrated at 28 for driving the shaft 15. The driving means for the work shaft 23 includes a pulley 29 on the shaft 23, a pulley 31 and a clutch 32 on a countershaft 33 suitably journaled in bearings carried by the frame 13, a belt 34 connecting the pulleys 29 and 31, and suitable means for driving the pulley 31. The means for driving the pulley 31 includes, for example, a rotatable pulley 35 on the countershaft drivingly connectible through the clutch 32 with the pulley 31, a pulley 36 fixed on and rotatable with the shaft 15, a belt 37 drivingly connecting the pulley 36 with the pulley 35, and belt tensioning means 38 mounted on the frame for engaging the belt 34 and maintaining it taut.

A carriage operating handle 39 is secured as at 41 intermediate its ends to a bracket 42 pivotally mounted by a bolt 43 to the movable carriage 21. This handle has an arm 44 at an end thereof slidably fulcrumed in an arm 45 projecting from the frame, whereby the handle may be employed to move the carriage 21, with the work between the live and dead centers 24 and 26, toward and away from the lathe tool.

As already mentioned, the arm 44 is slidably fulcrumed in the arm 45 between adjustable stops 46, and has a loose connection 47 with a clutch operating lever 48, as shown in Fig. 3. The loose connection 47 with the lever 48 permits the manipulation of the handle 39 about the fulcrum in the arm 45 for operating the carriage 21, and also permits the operation of the clutch operating lever 48 by moving the handle 39 longitudinally and about the pivot bolt 43. Adjustable nuts 49 on the arm 44 on opposite sides of the clutch operating lever 48 serve to engage the lever 48 to cause the operation of the clutch 32.

In order to assure the proper positioning of the work in a lathe of the type described above without interfering with the movements of the carriage 21 or the other lathe operations, the novel work positioning device of the invention is provided with work supporting means having an adjustable work supporting position and an idle position. This work supporting means is automatically operable to receive, to support, and to position the work for clamping at the proper axis of rotation between the live and dead centers 24 and 26; to allow the work after such clamping between the live and dead centers to be moved to the operative position for being turned; and after each piece of work has been turned and withdrawn from the lathe tool, to receive, to support, and to position each succeeding piece of work for clamping at the proper axis of rotation between the live and dead centers.

The work supporting means just mentioned is illustrated as including a pair of supporting brackets or frame members 51, each having an arm 52 provided with a pair of bolt receiving apertures 53 and secured in spaced relation to the carriage 21 by bolt and nut assemblies 54. Each of the brackets 51 has an arm 55 provided with a laterally extending portion 56 underlying the line between the live and dead centers 24 and 26 and with an arcuate slot 57.

A pair of rods or bars 58 extending between the arms 56 of the spaced brackets extend through the arcuate slots 57 and are suitably secured outwardly as at 58' of each arm 56 to a plate 59. Each of these plates 59 carries an adjustable bracket 61 having an arcuate work supporting arm 62 and an arm 63 projecting therefrom and provided with an adjusting slot 64 for adjustably receiving a mounting bolt 65 passing through the slot and threading into the plate 59. Preferably the face of each arm 63 at the sides of the slot 64 is serrated as at 66 (see Figs. 6 and 7) and a serrated washer 67 on each bolt 65 cooperates with the serrated portions 66 in holding the bracket 61 in an adjusted position.

The shape of the slots 57 is such that they will serve to guide the assembly, including the bars 58 and plates 59 carrying the adjustable brackets 61, between a work supporting position where the centers of the arcuate arms 62 are substantially in the plane between the line of the dead centers 24 and 26 and an idle position where the arcuate arms are wholly below the work.

To secure such movement of the adjustable brackets 61 automatically, a pair of links 68 are secured to one of the bars 58. Each of these links is secured to the bar 58 inwardly adjacent a bracket 61 and extends to a pivotal connection 69 with an arm or bracket 71 mounted as at 72 on the frame 13.

In operation the work supporting arcuate arms 62 are shown in Fig. 3 in the work supporting position to receive a bowling pin blank 11. The thickness of the soft or heart portion 12 of the blank 11 is estimated or measured. The operator then adjusts the arcuate arms 62 to such a position that when the blank 11 is placed therein the longitudinal center axis thereof, although in the same plane as the live and dead centers 24 and 26, will be for example above the centers 24 and 26 a distance equal to or slightly greater than the thickness of the heart portion 12.

The blank 11 with the heart portion 12 up is placed in the work supporting arms 62 and the tail adjustment and lock 27 is manipulated to clamp the work between the live and dead centers for rotation about this predetermined axis. While a single setting or adjustment of the arcuate arms may be satisfactory for a plurality of blanks 11, any variations in thicknesss of the heart portions 12 may be compensated for by the adjustment bolts 65, the serrations 66 serving as indicia for the desired amounts of adjustment.

It will be understood that the work positioning device may be employed for carrying the blank 11 with the heart portion 12 down, the arms 62 being in such case adjusted to position the longitudinal center axis of the blank 11 below but in the same plane with the live and dead centers 24 and 26. As in the case described above, the work is then clamped for rotation between the live and dead centers by manipulation of the tail adjustment and lock 27.

In this manner the proper axis of rotation for the work may be predetermined and the work may be chucked for rotation about such axis. When the work is so chucked the lathe will remove the desired amount of material from all sides of the work after the lathe tool and rotating work are brought into cutting relationship. In the lathe shown in the drawings, this is accomplished by sliding the movable carriage 21 along the parallel slides 14 towards the tool shaft 15. During this movement of the carriage 21, the brackets 51 in moving with the carriage 21 cause the arcuate slots 57 to guide the rods 58 therein about their pivots 69 downwardly so that the work supporting brackets 61 are moved to their idle position. To remove the work, the carriage in sliding away from the tool shaft 15 carries the brackets 51 with it, thus causing the slots 57 to act as cams moving the rods 58 up about their pivots 69, which returns the arcuate arms 62 to their work supporting position.

With more particular reference to the bowling pins, the blanks may be eccentrically chucked so that the heart or soft portion usually at one side of the blank will be removed and yet only the material necessary or desirable to produce the bowling pin of the shape shown at 73 will be removed from the other sides of the blank. Thus by virtue of the invention the hard portion of each blank forms or constitutes the finished bowling pin without necessitating the removal of more than a minimum amount of such hard material, whereby the quality of bowling pins will be uniformly good. The novel work positioning device being automatic and simple in operation will result therefore not only in a saving of time and labor, but also in a saving of materials.

While I have illustrated and described a preferred embodiment of my invention, many modifications may be made without departing from the spirit of the invention and I do not wish to be limited to the precise details of construction set forth, but desire to avail myself of all changes within the scope of the appended claims.

Having thus described my invention, what I claim as new and desire to secure by Letters Patent of the United States, is:

1. A bowling pin lathe having a movable carriage, and head and tail stocks on said carriage providing live and dead centers for receiving a bowling pin blank, in combination with supporting means for supporting a bowling pin blank, link means connecting said supporting means to a stationary lathe member, movable guide means guidingly engaging said link means for moving said supporting means between a work supporting position and an idle position to position the bowling pin blank for chucking between said live and dead centers when said supporting means is in its work supporting position and for permitting the operation of the lathe without interference from said supporting means when it is in its said idle position, and means connecting said movable guide means to said movable carriage for operating said work supporting means automatically upon the operation of said movable carriage.

2. A bowling pin positioning device adapted to position a bowling pin blank for chucking in a lathe at a predetermined axis of rotation eccentrically of the bowling pin blank, comprising a pair of arcuate arms for supporting the blank, movable connecting means spacing said arms apart, movable guiding means associated with said movable connecting means whereby to guide said movable connecting means to cause said means to move said arms to and from a chucking position, and actuating means for moving said movable guide means whereby said movable connecting means moves said arcuate arms to and from the chucking position.

3. A bowling pin positioning device for positioning a bowling pin blank eccentrically of a lathe work center whereby to remove a greater thickness of stock from one side than from another side of the blank, comprising a pair of movable brackets each having a guide slot therein, a connector extending between said brackets and guidably engaging in said guide slots, an arcuate work supporting arm adjustably carried at each end of said connector and arranged with its arcuate center in the same vertical plane as the lathe work center when said connector is moved to an operative position in said guide slots, and means connected to said connector for causing it to move said arcuate arms to and from the position at which their arcuate centers are vertically coplanar with the lathe working center.

4. A bowling pin positioning device adapted for positioning a bowling pin blank eccentrically of a lathe work center, comprising a movable arcuate work supporting arm for supporting a bowling pin blank for chucking eccentrically of the lathe work center, a movable member for moving said arm to and from its work supporting position, movable guiding means associated with said movable member whereby to guide it and to cause it to move said arm to and from its work supporting position, and actuating means automatically operable by the operation of a movable lathe member for moving said guiding means, whereby said movable member moves said arcuate arm to and from its work supporting position.

5. In a lathe, a bowling pin positioning device for positioning a bowling pin blank for chucking at a predetermined axis of rotation eccentrically of the bowling pin blank, comprising supporting means supporting the blank for chucking at a predetermined axis of rotation eccentrically of the bowling pin blank, a movable member connected to said supporting means, movable guiding means associated with said movable member whereby to guide it and to cause it to move said supporting means to and from a chucking position, and actuating means for moving said movable guiding means whereby said movable member moves said supporting means to and from the chucking position.

JOSEPH CZERNIAK.